Feb. 4, 1941.  W. H. HUTTER  2,230,865
PICKUP ARM
Filed May 29, 1939  2 Sheets-Sheet 1
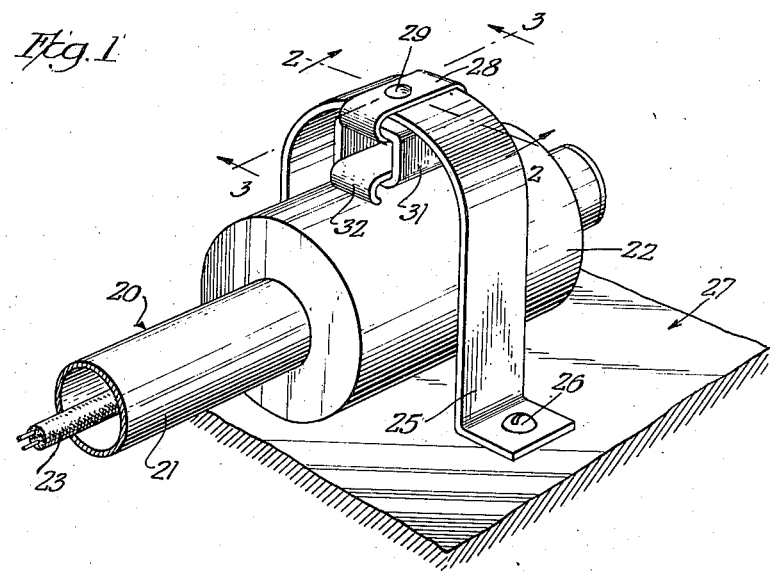
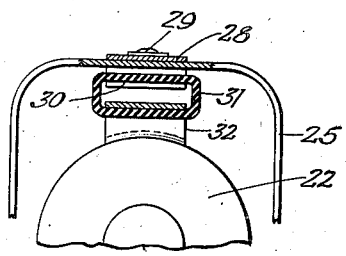
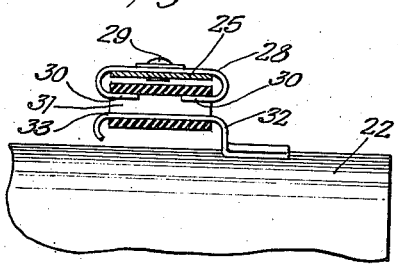
Inventor:
William H. Hutter
By: Sheridan, Davis & Cargill
Attys.

Feb. 4, 1941. W. H. HUTTER 2,230,865
PICKUP ARM
Filed May 29, 1939  2 Sheets-Sheet 2
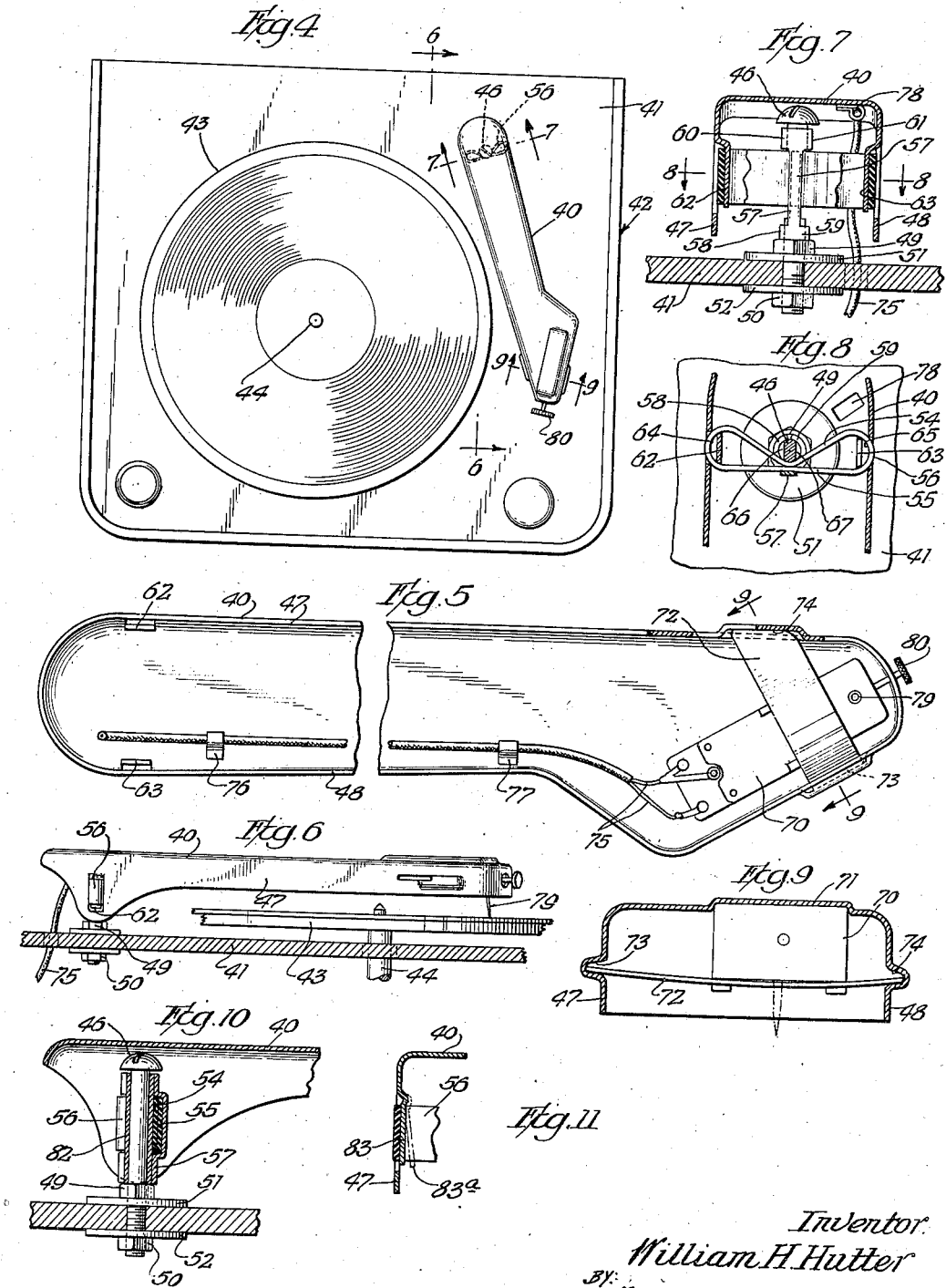
Inventor
William H. Hutter Patented Feb. 4, 1941

2,230,865

UNITED STATES PATENT OFFICE 2,230,865

PICKUP ARM

William H. Hutter, Chicago, Ill.

Application May 29, 1939, Serial No. 276,373

6 Claims. (Cl. 274—23)

This invention relates to pickup arms, and more particularly to features of construction and the supports for pickup arms.

This application is a continuation in part of my copending application Serial No. 223,442 for Pick-up arm, filed August 6, 1938.

An object of my invention is to provide a pickup arm and pivotal support therefor which tend to prevent extraneous or acoustic vibrations from interfering with or distorting natural and true reproduction of recorded sounds.

Another object of my invention is to provide a pickup arm support structure upon which the pickup arm is mounted for rotary movement and which includes a resilient vibration damping or absorbing element.

Another object of my invention is to provide a pickup arm and support structure therefor in which the pickup arm is supported for rotary movement through a flexible resilient element having vibration damping qualities.

Another object of my invention is to provide a pickup arm and support structure therefor which are not only inexpensive to manufacture and assemble, but also efficient in operation.

Another object of my invention is to provide a floating suspension support for a pickup arm which damps vibration and a mass on the pickup arm having sufficient inertia to reduce response of the arm to vibrations.

Other objects of the invention relate to various features of construction and arrangement of parts which will be apparent from a consideration of the following specification and accompanying drawings, wherein:

Fig. 1 is a fragmentary perspective view of one of the preferred forms of my invention;

Fig. 2 is a fragmentary sectional view taken substantially on a line 2—2 of Fig. 1 and in the direction of the arrows;

Fig. 3 is a fragmentary sectional view taken substantially on a line 3—3 of Fig. 1 and in the direction of the arrows;

Fig. 4 is a top plan view showing a modified form of my present invention and the adaptation thereof to a phonograph;

Fig. 5 is a bottom plan view of a portion of the apparatus shown in Fig. 4;

Fig. 6 is a fragmentary side elevation of the apparatus disclosed in Fig. 4 with a part thereof shown in section;

Fig. 7 is a fragmentary sectional view with the section taken substantially on a line 7—7 of Fig. 4 and looking in the direction of the arrows;

Fig. 8 is a fragmentary sectional view with the section taken substantially on a line 8—8 of Fig. 7 and looking in the direction of the arrows;

Fig. 9 is a sectional view with the section taken substantially on a line 9—9 of Fig. 5 and looking in the direction of the arrows;

Fig. 10 is a fragmentary sectional view showing a modification of a detail of my present invention; and Fig. 11 is a fragmentary sectional view showing a modification of another detail of my present invention.

Having particular reference to Figs. 1 to 3, inclusive, a phonograph pickup arm or tone arm 20 has a tubular metallic arm 21 which carries a pickup (not shown) at one end thereof. An inertia mass 22 surrounds and is secured to the arm 21 near the other or supported end thereof. Suitable insulated lead wires indicated at 23 extend through the arm 21 and carry electrical energy from the pickup to the reproducing apparatus of the phonograph. An inverted substantially U-shaped bracket 25, which is secured by screws 26 or other suitable fastening means to a base 27 which is preferably the motor board of the phonograph, provides a support for the pickup arm 20. The bracket 25 extends over the pickup arm and inertia mass 22 in spaced relation thereto. A suitable clip 28 is secured to the bracket 25 substantially midway between the sides thereof by a rivet 29 or other suitable fastening means. The clip 28 has ends 30 which extend toward each other and into the ends of a cylindrical elastic element 31. Another suitable clip 32 is secured to the inertia mass 22 and has a portion 33 which extends through the cylindrical elastic member 31 so that the pickup arm and inertia mass are suspended from the bracket 25 through the elastic element 31.

This cylindrical elastic element 31 is preferably made of rubber or some similar elastic material which flexes to permit rotary movement of the pickup arm 20 about the elastic member 31 as a pivot. The material, such as rubber, of which the elastic element 31 is made, should also be a good vibration damping or absorbing material. The characteristics of the rubber or other material from which the elastic element 31 is made, as well as the axial length of the cylinder determine the resistance of the support to rotary movement of the pickup arm. The width of the clips 28 and 32 is preferably sufficient to provide a stable support for the pickup arm which resists lateral rocking of the arm. Sufficient space is preferably provided between the ends 30 of the clip 28 and between the inertia mass 22 and the end of the projecting portion 33 of the clip 32 to permit removal and reinstallation of the elastic element 31 without bending or deforming the clips 28 and 32.

The resilient and vibration damping support for the pickup arm 20 which is provided by the elastic element 31 is particularly adapted to prevent the transmission of vibrations from other parts of the phonograph mechanism to the pickup arm and pickup. In this way it prevents the distortion of, or interference with the recorded sounds which are reproduced through the pickup, and consequently prevents acoustic feed-back as well as the transmission of vibrations to the pickup from the phonograph turntable driving mechanism.

The position of the clip 32 on the inertia mass 22 is preferably such that the suspension of the pickup arm 20 is near the middle of the inertia mass 22. The weight of the inertia mass 22 provides sufficient inertia in the suspended mass to resist movement of the pickup arm in response to vibrations. The inertia mass thus has a cooperative function in connection with the resilient element 31 in damping vibrations that would normally interfere with or distort the reproduction of recorded sounds. The mass 22 also adds stability to the pickup arm which is suspended in floating relationship with respect to the bracket 25 and base 27.

With particular reference to Figs. 4 to 8, inclusive, a pickup arm 40 is supported on a base or motor board 41 of a phonograph housing 42 adjacent a turntable 43 which is rotatably supported on a driven shaft 44. One form of support for the tone arm 40 is shown in Figs. 7 and 8. With this type of support the pickup arm 40 preferably has an inverted U-shaped section and may be very conveniently and cheaply made of sheet metal which is stamped or drawn in a desirable and convenient shape. A support post 46 comprises a screw extending upwardly from the base 41 between the sides 47 and 48 of the pickup arm 40. The support post 46 is secured to the base by nuts 49 and 50 that are threaded onto the support post and disposed on opposite sides of the base 41. Washers, such as 51 and 52, preferably separate the nuts 49 and 50, respectively, from the opposite sides of the baseboard 41. Two sides 54 and 55 of an elastic band or supporting element, which comprises a closed loop of rubber or other suitable elastic vibration damping material, are clamped together and against the support post 46 by a clamping member 57; the band or supporting element extending substantially equally and oppositely on the two sides of the support post 46. The clamping member 57 has lugs 58 and 59 on one end thereof and lugs 60 and 61 on the other end thereof which extend around the support post 46 to secure the clamping member thereto and effect the clamping of the band 56. Downwardly projecting tongues 62 and 63 which are preferably integral with the sides 47 and 48 of the pickup arm, extend through loops 64 and 65 in the band 56 on opposite sides of the support post 46. The tongues 62 and 63 are offset inwardly from the sides 47 and 48, respectively, and are substantially parallel to the sides. The band 56, when in position on the tongues 62 and 63 and clamped to the support post 46 by the clamping member 57, is somewhat stretched or stressed so that it provides a resilient vibration damping support for the pickup arm 40 and flexes to permit rotary movement of the pickup arm. With the band 56 thus disposed, the vertical or supporting stress on the band is edgewise of the sides of the band to provide greater stiffness and stability in the vertical direction. Rotary movement of the pickup arm flexes the sides of the band 56 around the support post 46 and clamping member 57. To reduce the resistance to such flexure of the band, the sides of the support post 46 are preferably cut away, as at 66 and 67, to reduce the width of the portion of the post 46 which engages the band. The intermediate portion of the clamping member 57 is also preferably narrow for the same reason.

A pickup 70 of the conventional crystal type is secured in the end of the pickup arm 40 opposite the end near which the support post 46 is located; the pickup 70 preferably being located in a suitable recess 71 in the pickup arm and held in position by a metal strip 72 which engages the pickup and extends across the pickup arm with the ends thereof seated in notches 73 and 74 in the sides 47 and 48. Electrical connections to the pickup 70 are made through insulated lead wires 75 that extend along the pickup arm and are held in place by suitable clips 76, 77, and 78. The pickup 70 has a needle 79 mounted therein and secured in position by a thumbscrew 80 which extends through the end of the pickup arm 40.

In the modification shown in Fig. 10, a metal sleeve bearing 82 is rotatably mounted on the support post 46 and is interposed between the support post 46 and the clamping member 57 so that the sides 54 and 55 of the band 56 are clamped between the clamping member 57 and the outside of the bearing 82. With this construction the bearing 82 rotates on the support post 46 during rotary movement of the pickup arm. The band or resilient support 56, while it flexes somewhat during the rotary movement of the arm, is not fully depended upon for flexure to permit rotary movement of the arm as in the form shown in Figs. 7 and 8.

In the modified construction shown in Fig. 11, the band 56 extends around tongues such as 83 on the pickup arm. The tongues 83 are integral with the sides of the pickup arm and are flexed from a position such as that indicated by dotted lines at 83a, to a position more nearly in alignment with the sides of the pickup arm after the band 56 has been put in place thereon. This construction makes the removal of the band 56 from the tongues such as 83 more difficult and tends to insure proper placement of the band 56 on the tongues.

While I have shown and described certain embodiments of my improvements for the purpose of illustration, I do not wish to be restricted specifically thereto except as so limited by the appended claims.

What I claim as new and desire to cover by Letters Patent is:

1. A pickup arm and support structure therefor comprising, in combination, a pickup arm, a support for the arm, and elastic means comprehending a closed loop of elastic material having opposite sides connected to the arm and the midportion thereof connected to the support.

2. A pickup arm and support structure therefor comprising, in combination, a pickup arm, a support for the arm, and a loop of elastic material connecting the arm and support, said loop of elastic material being disposed with the axis of the loop parallel to the direction of support so that the weight of the arm is supported edgewise of the loop and rotary movement of the arm about the support flexes the elastic material.

3. A pickup arm and support structure therefor comprising, in combination, a pickup arm having a substantially U-shaped transverse section, downwardly projecting tongues within and adjacent the sides of the arm, an elastic band extending around and stretched between the tongues, a support extending upwardly between the sides of the arm, and means on said support clamping the mid-portion of the elastic band.

4. A pickup arm and support structure therefor comprising, in combination, a pickup arm, downwardly projecting tongues at the sides of the arm, an elastic band extending around and between the tongues, a support post extending upwardly between the tongues and toward the arm, the section of said post being narrow as compared to the width of the arm, and means securing the mid-portion of the elastic band to the post.

5. A pickup arm and support structure therefor comprising, in combination, a pickup arm, an elastic element extending transversely across the arm with the mid-portion free for flexure, a support extending upwardly toward the arm adjacent the mid-portion of the elastic element, and means rotatably mounted on the support and secured to the mid-portion of the elastic element.

6. A pickup arm and support structure therefor comprising, in combination, a pickup arm having substantially an inverted U-shaped transverse section, downwardly projecting tongues integral with the sides of the arm, an elastic band extending around and between the tongues, a support extending upwardly between the tongues, and means securing the mid-portion of the elastic band between the tongues to the support.

WILLIAM H. HUTTER.